US011389765B2

(12) United States Patent
Roy et al.

(10) Patent No.: US 11,389,765 B2
(45) Date of Patent: Jul. 19, 2022

(54) HIERARCHICAL TRIPLY PERIODIC MINIMAL SURFACE STRUCTURES AS HEAT EXCHANGERS AND REACTORS

(71) Applicant: Lawrence Livermore National Security, LLC, Livermore, CA (US)

(72) Inventors: Pratanu Roy, San Ramon, CA (US); Du Nguyen, Fremont, CA (US); Joshuah K. Stolaroff, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 498 days.

(21) Appl. No.: 16/243,810

(22) Filed: Jan. 9, 2019

(65) Prior Publication Data

US 2020/0215480 A1 Jul. 9, 2020

(51) Int. Cl.
*B01D 53/22* (2006.01)
*B33Y 80/00* (2015.01)
*B33Y 10/00* (2015.01)
*B01D 71/02* (2006.01)
*B01D 71/70* (2006.01)
(Continued)

(52) U.S. Cl.
CPC .......... *B01D 53/228* (2013.01); *B01D 53/02* (2013.01); *B01D 67/0032* (2013.01); *B01D 67/0041* (2013.01); *B01D 71/022* (2013.01); *B01D 71/70* (2013.01); *B01J 20/28045* (2013.01); *B33Y 10/00* (2014.12); *B33Y 80/00* (2014.12); *B01D 2253/1122* (2013.01); *B01D 2253/202* (2013.01); *B01D 2253/342* (2013.01)

(58) Field of Classification Search
CPC .. B01D 53/02; B01D 2253/202; B01D 71/70; B01D 2253/342; B01D 53/228; B01D 2253/1122; B01D 67/0041; B01D 71/022; B01D 67/0032; B33Y 80/00; B33Y 10/00; B01J 20/28045
See application file for complete search history.

(56) References Cited

U.S. PATENT DOCUMENTS 5,968,765 A * 10/1999 Grage .................. B01D 69/141
   435/14
6,008,059 A * 12/1999 Schrier ................ G01N 33/525
   436/518

(Continued)

OTHER PUBLICATIONS

"hierarchy" 1 page American Heritage Dictionary of the English Language, Fifth Edition. 2016 <https://www.thefreedictionary.com/hierarchy> (Year: 2016).*

(Continued)

*Primary Examiner* — Anthony R Shumate
(74) *Attorney, Agent, or Firm* — Harness, Dickey & Pierce, P.L.C.

(57) ABSTRACT

The present disclosure relates to a transport mechanism apparatus for transporting at least one of a gas or a fluid. The transport mechanism may have an inlet, an outlet and a triply periodic minimal surface (TPMS) structure. The TPMS structure is formed in a layer-by-layer three dimensional (3D) printing operation to include cells propagating in three dimensions, where the cells include wall portions having openings, and where the cells form a plurality of flow paths throughout the transport mechanism from the inlet to the outlet, and where the cells form the inlet and the outlet.

21 Claims, 5 Drawing Sheets

(51) Int. Cl.
   *B01D 67/00* (2006.01)
   *B01D 53/02* (2006.01)
   *B01J 20/28* (2006.01)

(56) References Cited

U.S. PATENT DOCUMENTS

| | | | | |
|---|---|---|---|---|
| 6,186,341 | B1* | 2/2001 | Konstantin | B01D 63/061 |
| | | | | 210/488 |
| 9,440,216 | B2 | 9/2016 | Ryan | |
| 2001/0047959 | A1* | 12/2001 | Oishi | B01D 67/0011 |
| | | | | 210/500.23 |
| 2008/0132688 | A1* | 6/2008 | Zhou | A61L 2/0017 |
| | | | | 530/413 |
| 2011/0210067 | A1* | 9/2011 | Kato | B01D 61/147 |
| | | | | 210/634 |
| 2017/0304780 | A1* | 10/2017 | Komuro | B01D 69/02 |
| 2018/0305827 | A1* | 10/2018 | Wang | B01J 35/065 |

OTHER PUBLICATIONS

Wilhelm Schwieger, Albert Gonche Machoke, Tobias Weissenberger, Amer Inayat, Thangaraj Selvam, Michael Klumpp, and Alexandra Inayat. Hierarchy concepts: classification and preparation strategies for zeolite containing materials with hierarchical porosity. Chemical Society Reviews, 45(12):3353-3376, 2016.

H Terrones. Computation of minimal surfaces. Le Journal de Physique Colloques, 51(C7):C7-345, 1990.

Y Jung and S Torquato. Fluid permeabilities of triply periodic minimal surfaces. Physical Review E, 72(5):056319, 2005.

Tim Femmer, Alexander JC Kuehne, and Matthias Wessling. Estimation of the structure dependent performance of 3-d rapid prototyped membranes. Chemical Engineering Journal, 273:438-445, 2015.

Tim Femmer. Rapid Prototyping of Membranes and Membrane Devices. PhD thesis, Universitatsbibliothek der RWTH Aachen, 2016.

Paul J.F. Gandy, et al. "Nodal surface approximations to the P, G, D and I-WP triply periodic minimal surfaces," Chemical Physics Letters 336 (2001), pp. 187-195.

Han, L., Che, S., 2018. An Overview Of Materials With Triply Periodic Minimal Surfaces And Related Geometry: From Biological Structures To Self-Assembled Systems. Advanced Materials 30, 601-618. URL: https://link.springer.com/article/10.1007/s00170-020-06372-w, doi:https://doi.org/10.1007/s00170-020-06372-w.

Nesper, R., Grin, Y., 2011. Periodic Space Partitiners (psp) and their relations to crystal chemistry. Zeitschrift f¨ur Kristallographie 226, 692-710. URL: https://www.degruyter.com/document/doi/10.1524/zkri.2011.1429/html, doi:https://doi.org/10.1524/zkri.2011.1429.

Klinowski, J., Mackay, A.L., Terrones, H., 1996. Curved surfaces in chemical structure. Philosophical Transactions: Mathematical, Physical and Engineering Sciences 354, 1975-1987. URL: https://royalsocietypublishing.org/doi/10.1098/rsta.1996.0086, doi: https://doi.org/10.1098/rsta.1996.0086.

Bird, R.B., Stewart, W.E., Lightfoot, E.N., 2002. Transport Phenomena. John Wiley & Sons, pp. 181 and 430.

* cited by examiner

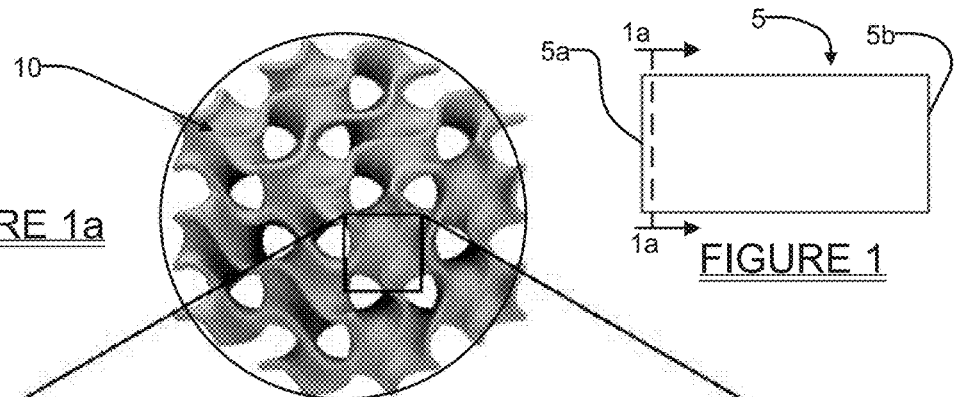
FIGURE 1a
FIGURE 1
Gas Separation Membrane
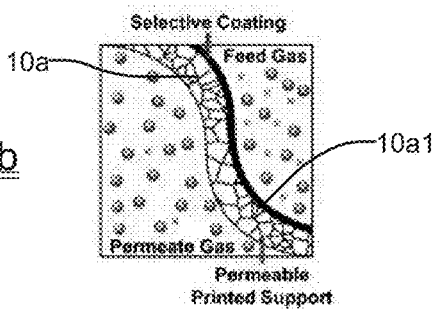
FIGURE 1b
Gas Absorption Monolith
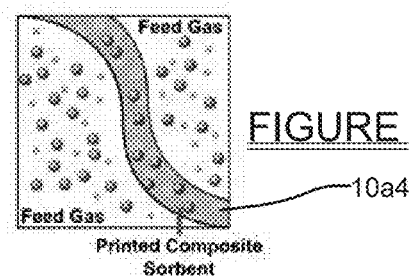
FIGURE 1e
Gas Absorption Monolith w/ Heat Exchange
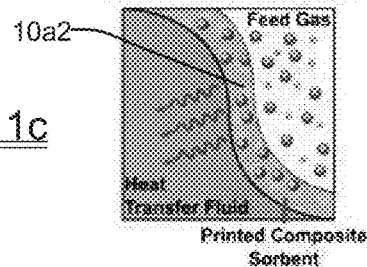
FIGURE 1c
Gas Liquid Contacting
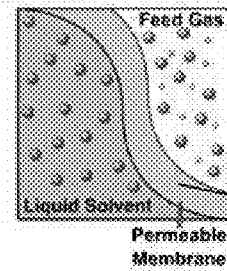
FIGURE 1f
Heat Exchange
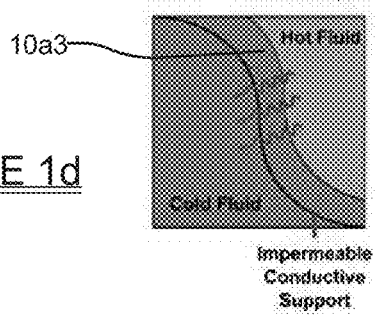
FIGURE 1d
Gas Liquid Contacting w/ Heat Exchange
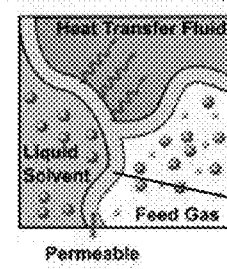
FIGURE 1g

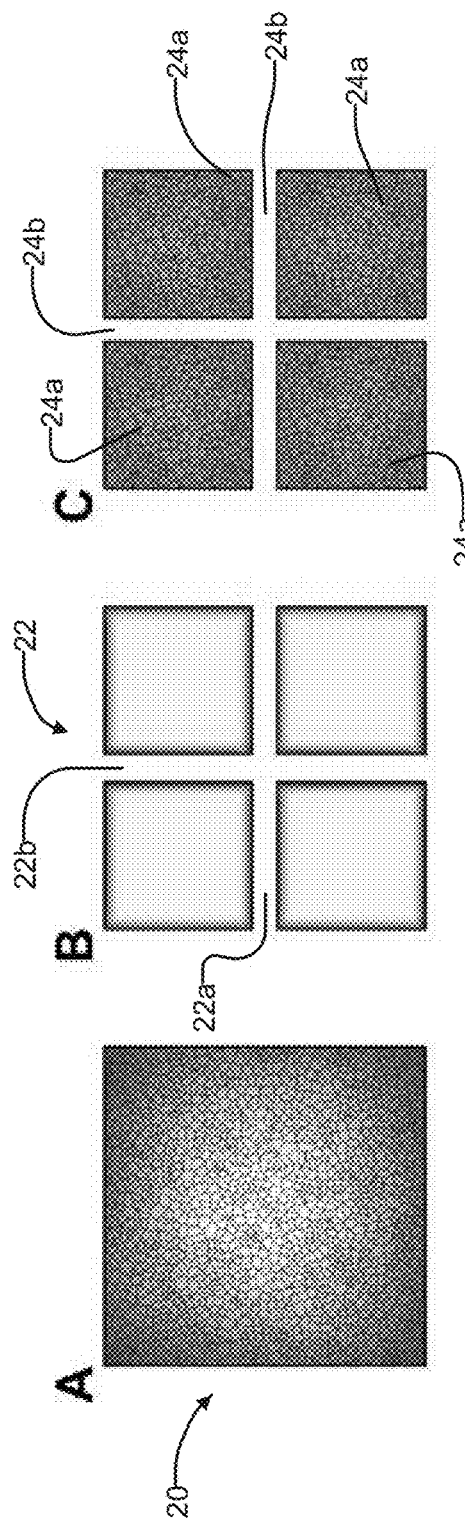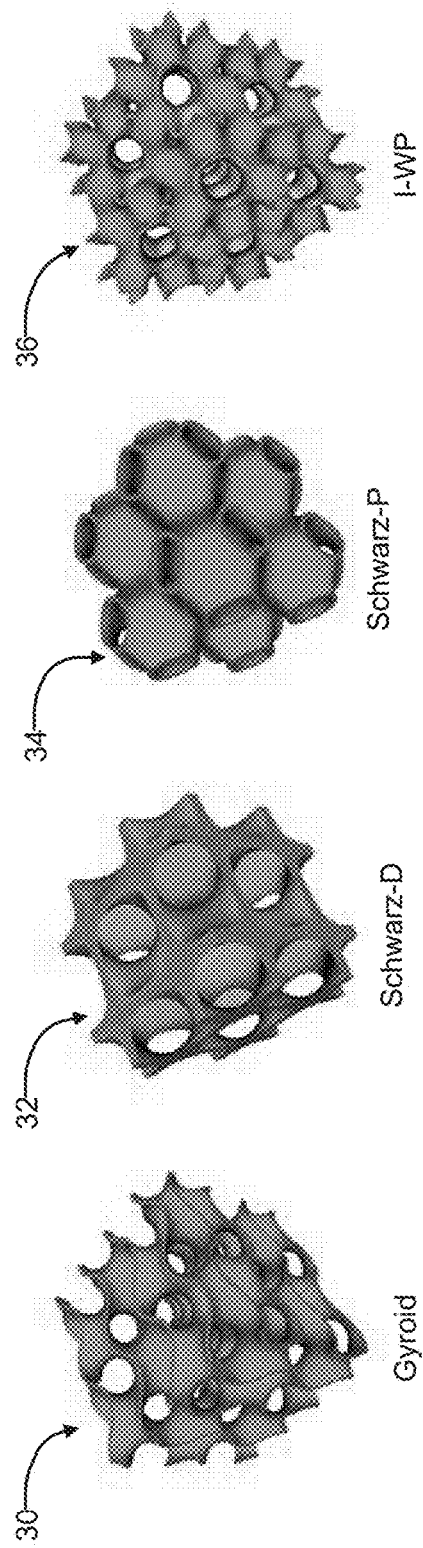

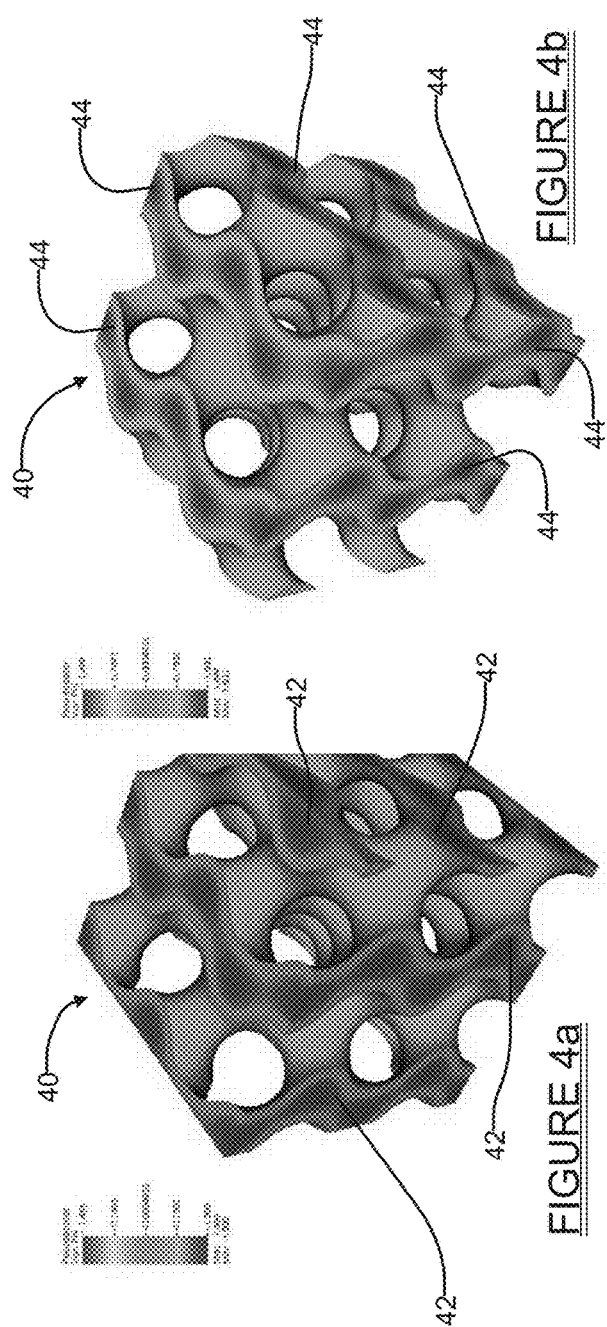
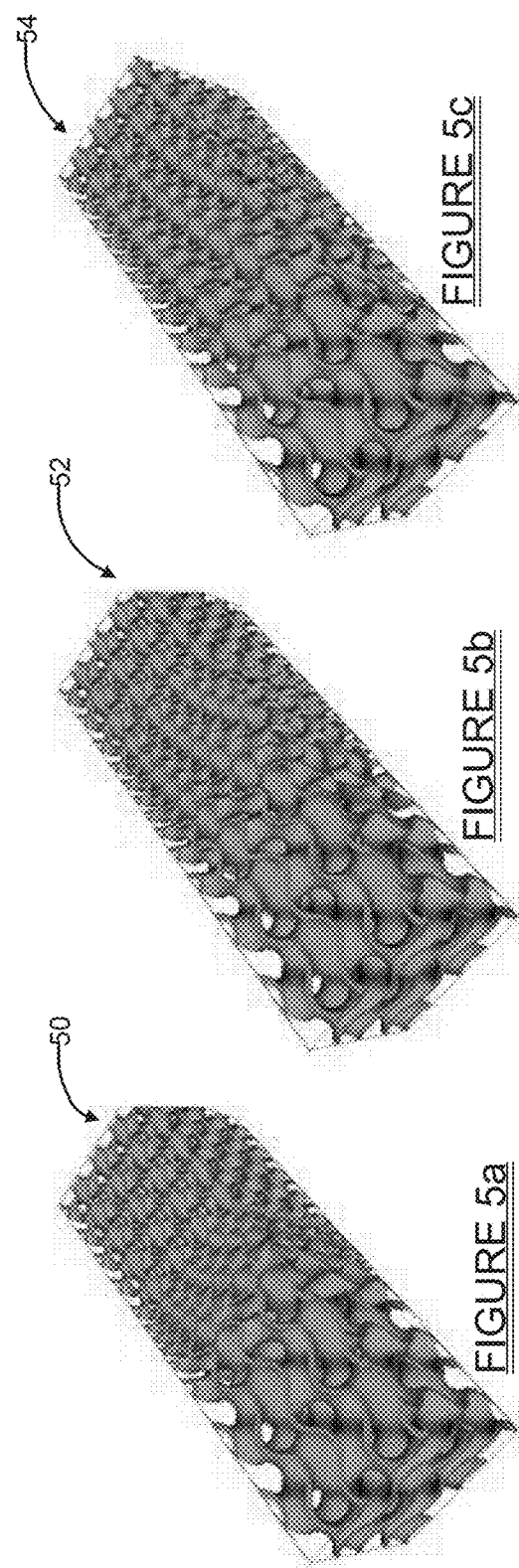

10 μm thick walls

20 μm thick walls

100μm thick walls

HIERARCHICAL TRIPLY PERIODIC MINIMAL SURFACE STRUCTURES AS HEAT EXCHANGERS AND REACTORS

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to reactors, and more particularly to reactors manufactured using 3D printing techniques, and which incorporate a Triply Periodic Minimal Surface construction to significantly enhance the transfer of at least one of mass or heat, or to enhance structural robustness, or to reduce the energy required for pumping fluids through the reactor.

BACKGROUND

This section provides background information related to the present disclosure which is not necessarily prior art.

A wide range of applications in energy and chemical processing would benefit from reactors that are more efficient at transferring mass or heat, more compact, have lower capital cost, lower energy use from pumping fluids, or operate at higher temperature and pressure. Reactors based on Triply Periodic Minimal Surfaces ("TPMS") can offer all these benefits. TPMS structures consist of two inter-penetrating fluid volume domains separated by a thin wall. TPMS structures exist throughout nature (e.g., biological membranes and rock crystals) and exhibit superior structural strength using a minimum amount of material. TPMS structures also exhibit improvement in heat transfer and mass transfer due to continuously turning flow paths and large interfacial areas. Until recently, TPMSs have been largely theoretical, but with advancements in additive manufacturing (AM) technology, there is renewed interest in applying AM technology to help in creating TPMS reactors for industrial use.

SUMMARY

This section provides a general summary of the disclosure, and is not a comprehensive disclosure of its full scope or all of its features.

In one aspect the present disclosure relates to a transport mechanism apparatus for transporting at least one of a gas or a liquid. The apparatus may comprise an inlet, an outlet, and a triply periodic minimal surface (TPMS) structure formed in a layer by layer three dimensional (3D) printing operation. The TPMS structure is formed to include cells propagating in three dimensions, where the cells include wall portions having openings, and where the cells form a plurality of flow paths throughout the transport mechanism from the inlet to the outlet, and where the cells form the inlet and the outlet.

In another aspect the present disclosure relates to a transport mechanism apparatus for transporting at least one of a gas or a liquid. The apparatus may comprise an inlet, an outlet, and a triply periodic minimal surface (TPMS) structure formed in a layer-by-layer, three dimensional (3D) printing operation. The TPMS structure includes cells propagating in three dimensions, where the cells include wall portions having openings, and where the cells form a plurality of flow paths throughout the transport mechanism from the inlet to the outlet, and where the cells form the inlet and the outlet. In addition, at least one of a wall thickness or a dimension of the cells is non-uniform across at least one of a length (X plane), a height (Y plane) or depth (Z plane) of the apparatus.

In still another aspect the present disclosure relates to a method for forming a transport mechanism for transporting at least one of a gas or a liquid. The method may comprise using a three dimensional (3D) printing operation to form the mechanism with an inlet and an outlet. The method may further include controlling the 3D printing operation to create the mechanism as a triply periodic minimal surface (TPMS) structure formed in a layer-by-layer process using the 3D printing operation. The method may further include controlling the 3D printing operation such that the TPMS structure includes cells propagating in three dimensions, where the cells include wall portions having openings, and where the cells form a plurality of flow paths throughout the transport mechanism from the inlet to the outlet, and where the cells at least one of vary in dimension throughout the mechanism, or vary in wall thickness throughout the mechanism.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings. In the drawings:

FIG. 1 illustrates a highly simplified side view of one example of a portion of a transport mechanism, in this example a reactor, formed by a tubular structure in accordance with the present disclosure;

FIG. 1a illustrates an enlarged, cross sectional portion of the tubular structure of FIG. 1, showing a high level illustration of the triply periodic minimal surface (TPMS) construction of the mechanism;

FIG. 1b illustrates an example of a wall construction for the structure shown in FIG. 1a but where the wall portion incorporates a selective coating and forms a gas separation membrane;

FIG. 1c illustrates an example of a wall construction for the structure shown in FIG. 1a but where the wall portion incorporates a printed composite sorbent to form a gas absorption monolith with heat exchange capability;

FIG. 1d illustrates an example of a wall construction for the structure shown in FIG. 1a but where the wall portion includes an impermeable conductive support to form a heat exchange capability;

FIG. 1e illustrates an example of a wall construction for the structure shown in FIG. 1a but where the wall portion forms a printed composite sorbent to form a gas absorption monolith;

FIG. 1f illustrates an example of a wall construction for the structure shown in FIG. 1a but where the wall portion incorporates a permeable membrane that forms a gas liquid contacting surface;

FIG. 1g illustrates an example of a wall construction for the structure shown in FIG. 1a but where the wall portion incorporates a permeable membrane that forms a gas/liquid contacting surface with heat exchange;

FIG. 2a illustrates a conventional prior art, high surface area structure, which presents difficulties in diffusion to the bulk of the material volume, but presents a large amount of surface area for reaction;

FIG. 2b illustrates a conventional prior art low surface area structure which enables reactions to occur throughout the bulk of the structure due to larger diffusion pathways 22a;

FIG. 2c shows a portion of a TPMS hierarchical structure made in accordance with the teachings of the present disclosure in which a combination of high surface area and large, intersecting diffusion pathways enables enhanced reaction;

FIGS. 3a-3d illustrate different types of TPMS structures that may be formed using the teachings of the present disclosure;

FIGS. 4a and 4b illustrate TPMS structures which may be made in accordance with the present disclosure, which each have two separate fluid volumes in double Gyroid structures, which are separated by a relatively thick wall which helps to form the third volume;

FIGS. 5a-5c show examples of hierarchical Gyroid structures made using the teachings of the present disclosure which shrink in size from 1× (FIG. 5a) to 0.5× (FIG. 5c);

DETAILED DESCRIPTION

Figure 9:
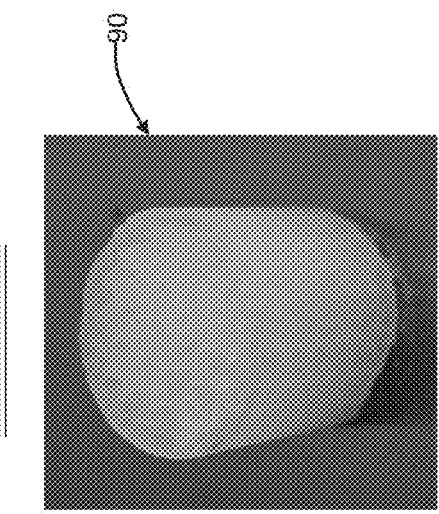
FIG. 9 illustrates a TPMS structure forming a mold, which was fabricated in polydimethylsiloxane (PDMS) using a fused deposition modeling, in accordance with the present disclosure.

Example embodiments will now be described more fully with reference to the accompanying drawings.

The present disclosure relates to transport mechanisms constructed using 3D printing technologies, and which make use of Triply Periodic Minimal Surface ("TPMS") geometries. The term "transport mechanisms" as used herein is broadly meant to include structures typically used to facilitate mass transfer and/or heat transfer, such as one or more parallel extending tubular pipes which may have internal walls or baffles, heat exchangers using plates arranged to form serpentine flow paths, printed circuit heat exchangers, hollow fiber membrane reactors, gas absorption beds, catalytic converters, autothermal reactors, etc.

TPMS transport mechanism structures exhibit enhanced flow properties and interfacial area compared to conventional reactor and heat exchanger geometries, such as tubes and flat plates. This results in significantly improved energy efficiency, more efficient mass transfer, more compact equipment, and reduced capital cost for TPMS-based transport mechanisms, especially for reactors and heat exchangers. These complex structures, which are not possible to fabricate by traditional manufacturing techniques, can now be constructed using the modern additive manufacturing or 3D printing technologies. Such 3D printing systems and methodologies may include one or more of the systems and methods show in U.S. Pat. No. 9,308,583 to El-Dasher et al., issued Apr. 12, 2016; U.S. Patent Publication No. US-2014-0367894-A1 to Kramer et al., published Dec. 18, 2014, the entire disclosures of which are hereby incorporated by reference into the present disclosure.

The present disclosure describes several new embodiments and methodologies for turning TPMS geometries into practical reactors. Initially, size-graded or hierarchical TPMS geometries are a modification of TPMSs that allow for readily implemented fluid connections and adjustment of the interfacial area to match the reaction needs of a specific application. Secondly, thickness-graded TPMS geometries have variable wall thickness, which maintains strength and structural robustness of the reactor across sections of different cell size, operating pressure, or operating temperature. Thirdly, TPMS structures can now be cast from 3D printed sacrificial molds in a permeable material to create membrane reactors, including gas-liquid absorption reactors. This form of casting has been shown before in the art and is known as "negative manufacturing in Boron Carbide (https://www.sciencedirect.com/science/article/pii/S0264127518302053).

The resulting reactors manufactured using the teachings of the present disclosure have specific applications in supercritical $CO_2$ ($sCO_2$) power cycles, where compact heat exchangers that operate at high temperature and pressure (400-800° C., up to 300 bar) are required. Using powder bed laser fusion, or other additive manufacturing techniques, various reactor designs can be fabricated in the specialty alloys, such as Inconel 625, required for these applications. Additionally, Ultra High Temperature Ceramic (UHTC) heat exchangers, which can withstand temperatures above 1200° C., can be manufactured using binder jet additive manufacturing or other additive methods. Industrial $CO_2$ capture is another application where TPMS reactors can be applied. The major thrust in $CO_2$ capture research is how to reduce capital cost of equipment while also improving energy efficiency. TPMS reactors offer high interfacial area and high rates of mass transfer, which may reduce the overall size of gas absorption equipment and reduce capital cost. Improved heat exchangers are also needed for $CO_2$ capture.

As a flexible platform, TPMS structures can be used in various configurations to support different materials and functions within the carbon capture system. FIG. 1 shows a high level side view of a portion of a transport mechanism 5 made in accordance with the teachings of the present disclosure, where the mechanism includes an inlet 5a and an outlet 5b. FIG. 1a shows one example of a TPMS wall structure 10 that is used to form the mechanism 5. FIG. 1b shows an enlarged wall portion 10a of the structure 10, where the wall portion 10a forms a gas separation membrane formed by a permeable 3D printed support structure with a selective coating 10a1 on one side. FIG. 1c shows the wall portion 10*a* forming a gas absorption monolith with heat exchange using a 3D printed composite sorbent 10*a*2. FIG. 1*d* shows the wall portion 10*a* forming a heat exchange structure made from an impermeable conductive support 10*a*3. FIG. 1*e* shows the wall portion 10*a* forming a gas absorption monolith formed from a 3D printed composite sorbent 10*a*4. FIG. 1*f* shows the wall portion 10*a* forming a gas-liquid contacting structure through a permeable membrane 10*a*5. FIG. 1*g* shows the wall portion 10*a* forming a permeable membrane 10*a*6 for acting as a gas-liquid contacting surface with a heat exchange capability. The teachings provided herein apply to all of the configurations/applications shown in FIGS. 1*a*-1*f*.

In one implementation, the present disclosure combines hierarchical networks with TPMS geometries, both of which offer dramatic improvements in reactor and heat exchanger properties. In gas-liquid mass transport systems, a common challenge is how to increase the available surface area for contact between gas and liquid without creating diffusion limitations. Increasing the specific surface area uniformly leads to narrow diffusion pathways for gasses and restricts the interaction between gasses and liquids. Lowering the specific surface area improves the diffusion pathways, but results in less surface area for the reaction to occur. Hierarchical systems are common in nature, especially for mass flow systems like vasculature and river deltas. Hierarchical systems can overcome this limitation through optimized patterning between low and high specific surface area structures to obtain high diffusion and high interaction between gasses and liquids. For example, in FIG. 2*a*, a high surface area structure 20 is shown. The high surface area structure 20 presents difficulties in diffusion to the bulk of the material volume, but a large amount of surface area for reaction is present. FIG. 2*b* shows a prior art low surface area structure 22. The low surface area structure 22 enables reactions to occur throughout the bulk of the structure due to larger diffusion pathways 22*a*. FIG. 2*c* shows a hierarchical structure 24 made in accordance with the teachings of the present disclosure in which a combination of high surface area 24*a* and large, intersecting diffusion pathways 24*b* enables enhanced reaction. The use of additive manufacturing enables the direct control over the whole geometry of the structure 24 to create optimized structures with both high surface area and deterministic pathways for gas diffusion. Hierarchies such as that shown in FIG. 2*c* dramatically improve mass transfer in reactors.

The work of the co-inventors of the present disclosure have invented ways to create hierarchical networks of TPMS structures using 3D additive manufacturing techniques. The present disclosure presents the mathematical description of the triply periodic minimal surfaces and shows that these minimal surfaces can be seamlessly connected to create smoothly varying hierarchical structures. The present disclosure also shows that these hierarchical structures can be printed by using well known additive manufacturing techniques.

Using a hierarchy of sizes in the TPMS geometry improves flow characteristics and eases connections to the transport mechanism, but presents challenges for structural robustness. A second innovation developed by the co-inventors is to vary the wall thickness of the TPMS structure along with the cell size, or alternatively to vary the wall thickness according to expected transport mechanism operating conditions. This can ensure that the transport mechanism is robust and can support pressurized reactions. A third innovation by the co-inventors is to fabricate the TPMS out of permeable material, such as silicone, porous polymers, or porous ceramics. This allows all of the transport mechanism configurations shown in FIGS. 1*b*-1*g* beyond just a heat exchange function. The porous material can be coated on one side in post-processing to give selectivity to the membrane or to seal in an active component.

It will be appreciated that a minimal surface is a surface with the smallest possible area within the boundary of that surface. Minimal surfaces have zero mean curvature at every point, which means that the surface bends equally in the direction of principal curvatures. Soap films are examples of minimal surfaces that minimize their area under surface tension. Triply periodic minimal surfaces are a special group of minimal surfaces which repeat themselves in three dimensions. A triply periodic minimal surface divides the space into two non-intersecting but continuous volumes that are intertwined with each other. Because of this intertwining and convoluted nature of the surface, triply periodic minimal surface structures can offer higher surface area to volume ratio than simple geometric structures like pipes or microchannels. The enhanced surface area is desirable for high heat transfer and mass transfer applications such as heat exchangers and reactors. Meanwhile, the turning flow paths in some TPMS structures enhance mixing without creating the snags and weak points seen in conventional mixing channels, like zig-zags. The cells created by TPMS structures described herein also provide the benefit of creating more eddies and/or turbulence in the flowing medium as the medium flows through the cells of the transport mechanism, which enhances mixing, which is important for mass transfer/reaction mechanisms.

Using TPMS structures for such applications have recently been reported in Jung, Y. and Torquato, S. "Fluid permeabilities of triply periodic minimal surfaces." *Physical Review E*, 72, No. 5 (2005):056319; Femmer, Tim, Alexander J C Kuehne, and Matthias Wessling. "Estimation of the structure dependent performance of 3-*D rapid prototyped membranes.*" Chemical Engineering Journal, 273 (2015): 438-445; Femmer, Tim. *"Rapid Prototyping of Membranes and Membrane Devices."* (Doctoral dissertation), Universitätsbibliothek der RWTH Aachen), 2016; and Ryan, Robert C. *"Minimal surface area mass and heat transfer packing."* U.S. Pat. No. 9,440,216, 13 Sep. 2016. Femmer et al. showed that a TPMS geometry offered up to 14 times more heat transfer per unit surface area and per unit reactor volume compared to plates and flat tubes. The results suggest that TPMS heat exchangers can be made an order of magnitude smaller and with substantially less material than even state-of-the-art micro-channel heat exchangers.

The triply periodic minimal surfaces (TPMS) can be generated by using the Weierstrass formula which requires numerical integration of complex functions in a complex domain (i.e., where, mathematically, a complex number represents a form a+ib, where a and b are real numbers and i is an imaginary number equal to the positive square root of −1, that is $i^2=-1$). Alternatively, the TPMS surfaces can be represented with a level set function. The co-inventors have developed a computer code to generate the TPMS structures using level set functions. A level set function in three dimensions can be represented by the following equation:

$$F(x,y,z)=t \qquad \text{(Equation 1)}$$

Here, t is a constant which determines the volume fractions of the two domains separated by the level set surface. The function F (x, y, z) controls the shape of the TPMS geometry. The following equations represent some of the common TPMS geometries with known analytic expressions:

The Schoen-G or Gyroid:

$$F(x, y, z) = \cos\left(\frac{2\pi}{L}x\right)\sin\left(\frac{2\pi}{L}y\right) + \cos\left(\frac{2\pi}{L}y\right)\sin\left(\frac{2\pi}{L}z\right) + \cos\left(\frac{2\pi}{L}z\right)\sin\left(\frac{2\pi}{L}x\right) \quad \text{(Equation 2)}$$

The Schwartz-P surface:

$$F(x, y, z) = \cos\left(\frac{2\pi}{L}x\right) + \cos\left(\frac{2\pi}{L}y\right) + \cos\left(\frac{2\pi}{L}z\right) \quad \text{(Equation 3)}$$

The Schwartz-D surface:

$$F(x, y, z) = \cos\left(\frac{2\pi}{L}x\right)\cos\left(\frac{2\pi}{L}y\right)\cos\left(\frac{2\pi}{L}z\right) + \sin\left(\frac{2\pi}{L}x\right) + \sin\left(\frac{2\pi}{L}y\right)\sin\left(\frac{2\pi}{L}z\right) \quad \text{(Equation 4)}$$

The I-WP surface:

$$F(x, y, z) = 2\cos\left(\frac{2\pi}{L}x\right)\cos\left(\frac{2\pi}{L}y\right) + 2\cos\left(\frac{2\pi}{L}x\right)\cos\left(\frac{2\pi}{L}z\right) + 2\cos\left(\frac{2\pi}{L}y\right)\cos\left(\frac{2\pi}{L}z\right) - \cos\left(4\frac{\pi}{L}x\right) - \cos\left(\frac{4\pi}{L}y\right) - \cos\left(\frac{4\pi}{L}z\right) \quad \text{(Equation 5)}$$

Here, L is the length of the cubic unit cell. These equations represent a single thin surface for a TPMS geometry, which divide the domain into two interpenetrating volumes. To obtain a finite wall thickness between these volumes, two level set functions may be combined in the following way:

$$F(x,y,z) = \pm t \quad \text{(Equation 6)}$$

FIGS. 3a-3d show four such TPMS structures 30-36 created in accordance with Equations 2-5, respectively. In these double-TPMS structures 30-36, the two level set surfaces divide the domain into three continuous volumes. FIG. 3a shows a Gyroid surface structure, FIG. 3b a Schwarz-D surface structure; FIG. 3c a Schwarz-P surface structure, and FIG. 3d a I-WP discontinuous surface structure. FIGS. 4a and 4b show the two separate fluid volumes in double Gyroid structures 40 which are separated by a relatively thick wall 42 (FIG. 4a) and 44 (FIG. 4b), which forms the third volume. The separate volumes are color coded by the value of the level set function, wherein the blue walls 42 in FIG. 4a indicate negative values and the red walls 44 in FIG. 4b positive values. The unit cell of these double Gyroid structures 40 in FIGS. 4a and 4b does not change in the domain, so the specific surface area (surface area per unit volume) remains uniform throughout the entirety of the structure.

The above equations are available in present day scientific literature. However, these repeating geometries alone do not constitute a reactor design. For example, an industrial scale reactor may have 1000's of unit cells on each face, making for a very challenging manifold design to connect this geometry to a single fluid inlet. In published laboratory designs, fluid connections are achieved by sealing off each side of the reactor in a solid, flat wall (see, for example, Femmer et al.), however this is unlikely to lead to efficient fluid distribution and even flow. Instead, the present disclosure proposes another unique method: smoothly grading the size of cells so that large cells at the ends provide easy points of connection. The gradient, or hierarchy, of sizes can also be adjusted to provide zones of high interfacial area (at the price of higher pressure drop) in some zones of the reactor, and lower interfacial area (and lower pressure drop) in zones where the reaction is not mass-transfer limited or heat-transfer limited.

The size gradient is achieved as follows. If L is the length of the unit cell and f is the shrinkage or expansion factor of the cell, then the two TPMS structures can be smoothly connected by modifying the unit cell length using the following equation:

$$L_{modified} = L + (1 - H_\varepsilon(\varphi))Lf \quad \text{(Equation 7)}$$

where $H_\varepsilon(\varphi)$ is the smoothed Heaviside function that determines the nature of variation of the graded zone:

$$H_\varepsilon(\phi) = \begin{cases} 1, & \phi < -\varepsilon \\ \left[1 + \frac{\phi}{\varepsilon} + \frac{1}{\pi}\sin\left(\frac{\pi\phi}{\varepsilon}\right)\right], & |\phi| \leq \varepsilon \\ x, & \phi > \varepsilon \end{cases} \quad \text{(Equation 8)}$$

Figure 5D:
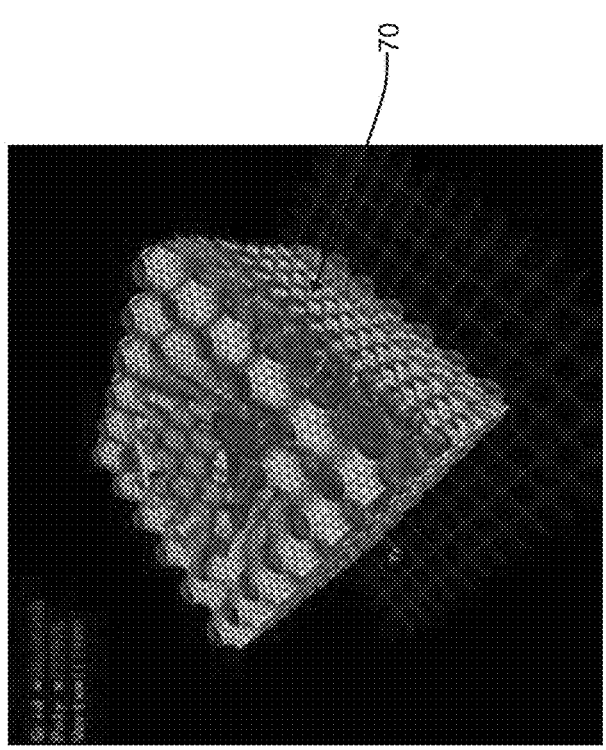
FIG. 5d shows another example where the cell density varies in all three dimensions rather than just one, and specifically where there is a circular density gradient in the X/Y plane and a standard density gradient in the Z plane.

Here, $\varphi(x, y, z)$ is the level set function to determine where the modification should take place. In our models we have chosen $\varphi=0$ to be the mid-plane of the graded zone. The value of E determines the span or length of the graded zone. This procedure seamlessly connects multiple TPMS structures creating a smoothly varying hierarchy. FIGS. 5a-5c show hierarchical Gyroid structures 50, 52 and 54, respectively, which shrink in size from 1× (FIG. 5a) to 0.5× (FIG. 5c). The span of the graded zone has been varied by changing ε from 0.2 L to L (leftmost FIG. 5a to rightmost FIG. 5c). FIG. 5d shows still another example of a structure 70 where the cell density is varied in all three of the X (length), Y (height) and Z (depth) planes. The structure 70 of FIG. 5d has a circular density gradient in the X/Y plane and a standard (regular) density in the Z plane.

Figure 7:
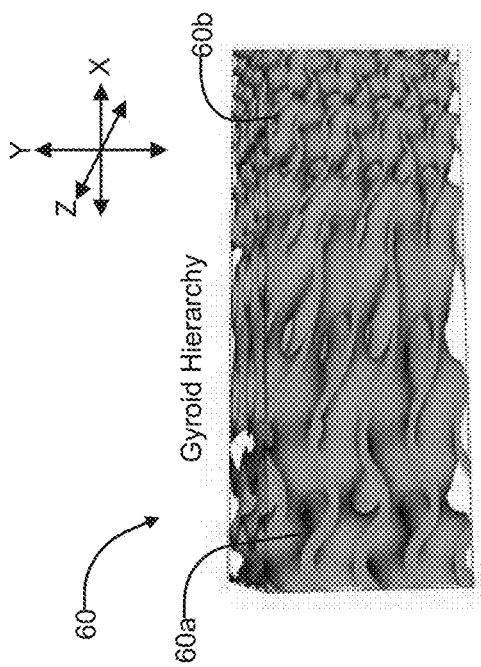
FIG. 7 illustrates how two TPMS geometries may be joined using an exponential function for a Schwarz-D geometry, and where the TPMS geometry includes three distinct but continuous sections.

Instead of the smoothed Heaviside function, one can also use any continuous function that smoothly varies between a range of numbers to join the two TPMS geometries. One such example is using an exponential function for Schwarz-D geometry, as shown for the structure 70 in FIG. 7, which includes distinct but continuous sections 70a, 70b and 70c. Larger cells on the left and right side of this hierarchical structure are used to connect the inlet and outlet ports to an external source (such as syringe pump), whereas the smaller cells in the middle portion act as the reactor or heat exchanger core where the enhanced transport mechanism takes place.

A similar strategy can be used to define smoothly varying wall thickness in a TPMS reactor. To accomplish this we modify F by multiplying it with a Heaviside function, as shown in the following equation:

$$F_{modified} = H_{249}(\varphi) F(x,y,z) \quad \text{(Equation 9)}$$

The Heaviside function $H_\varepsilon(\varphi)$ controls the variation in thickness and $\varphi$ control the location of this variation. The variable wall thickness property can be incorporated into the size-graded or hierarchical TPMS geometries to adjust the structural strength and robustness. This way one can selectively vary the interfacial area and wall thickness of TPMS reactors in a controlled manner.

Figure 6A:
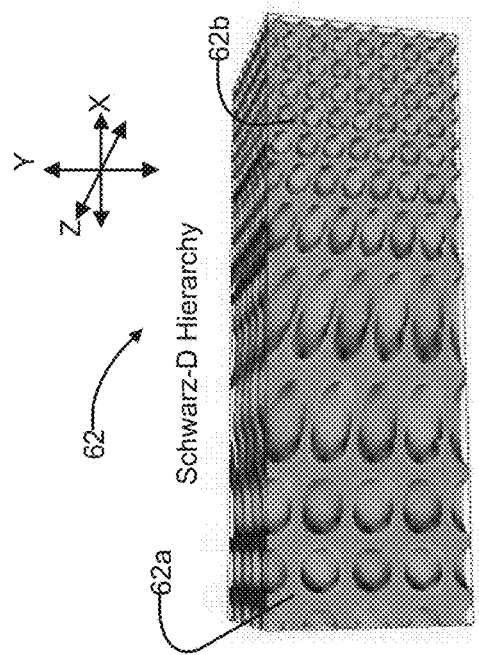
FIGS. 6a and 6b show two examples where the wall thickness of a TPMS structure made in accordance with the present disclosure has been varied in the horizontal direction.
Figure 6B:
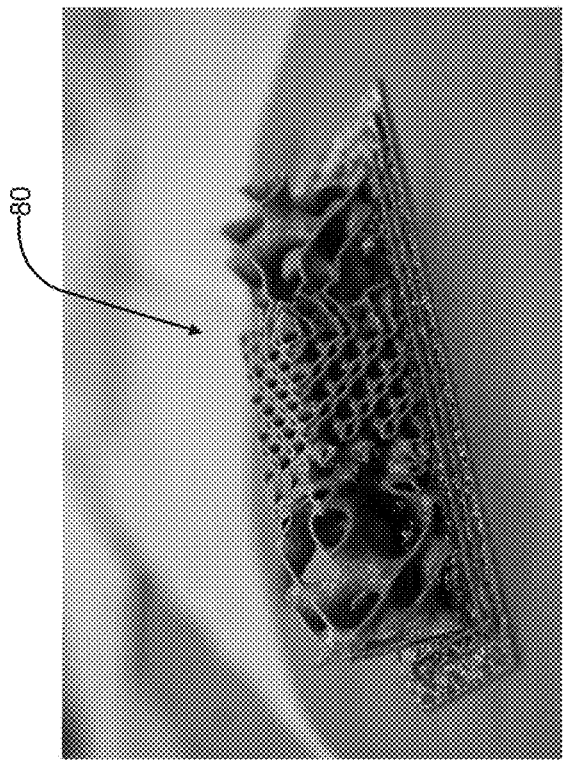

FIGS. 6a and 6b present two such examples where the wall thickness 60a has been varied in the horizontal direction (in the X plane representing length). FIGS. 6a and 6b show a structure 60 with Gyroid hierarchy (FIG. 6a) and a structure 62 (FIG. 6b) with a Schwarz-D hierarchy. In FIG. 6a, the wall thicknesses 60a and 60b can be seen to be different, with the thickness gradually getting less across the structure moving from left to right (i.e., along the X plane). Likewise, the structure 62 can be seen to have the wall thickness being gradually reduced from wall portion 62a to wall portion 62b (i.e., varying in the X plane, or the horizontal direction going left to right in FIGS. 6a and 6b). Accordingly, the present system and method presents a flexible way to maintain the structural robustness in selected parts of the TPMS geometry especially when these parts operate under high pressure and/or high temperature, while enabling control over wall thickness, cell densities and/or the overall number of cells in a given TPMS structure, in each of the X, Y and Z planes of the structure.

Hierarchical TPMS structures can be fabricated using a variety of additive manufacturing techniques such as, without limitation, fused deposition modeling, direct metal laser sintering, and binder jet technique.

Figure 8:
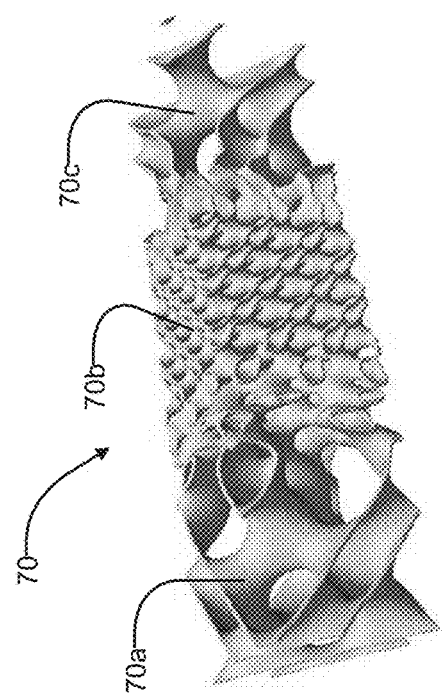
FIG. 8 shows a representation of a metal hierarchical, Schwarz-D structure fabricated using direct metal laser sintering, in accordance with the teachings of the present disclosure.

The co-inventors have fabricated a metal hierarchical, Schwarz-D structure 80, shown in FIG. 8, using direct metal laser sintering. This method involved using a bed of fine metal powder which was sintered using a laser. The structure 80 forms a 3D geometry which was formed from sintering 2D layers of the metal in a layer-by-layer assembly. A TPMS structure was also fabricated in polydimethylsiloxane (PDMS) using a fused deposition modeling to fabricate a mold 90 for the PDMS, as shown in FIG. 9. In fused deposition modeling, a thermoplastic material is extruded through a heated printer extruder head. The molten thermoplastic builds the 3D structure in a layer-by-layer process. The PDMS Schwarz-D TPMS structure 90 was fabricated by first making a 3D printed negative mold of the Gyroid structure using acrylonitrile butadiene styrene (ABS). The liquid PDMS is then cast into the mold and cured. Last, the ABS is removed using acetone and centrifugal force, resulting in a PDMS Gyroid TPMS structure.

Figure 10C:
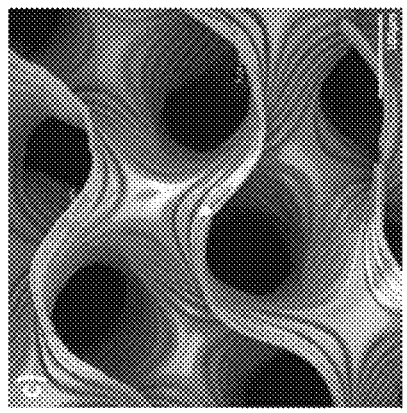
FIGS. 10a-10c show three examples of a silicone printed Gyroid structure printed using a Projection Micro-Stereo Lithography process, in accordance with the teachings of the present disclosure.
Figure 10B:
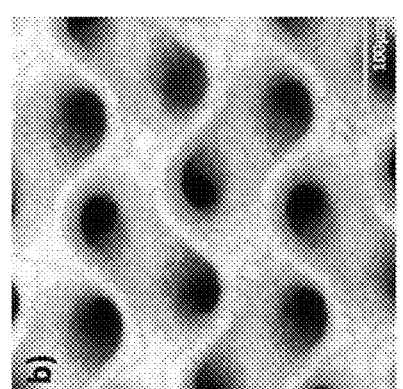
Figure 10A:
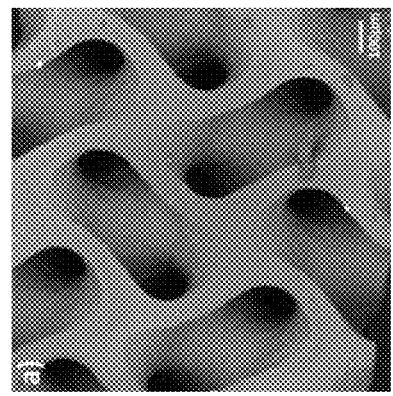

A hierarchical TPMS reactor can be directly printed in silicone. FIGS. 10a-10c show three examples of such a silicone printed Gyroid structure printed using a Projection Micro-Stereo Lithography process. FIG. 10a shows a printed Gyroid structure 100 having wall thicknesses of 100 μm (or 100 micro-meter); FIG. 10b shows a printed Gyroid structure 102 having wall thicknesses of 20 μm; and FIG. 10c shows a printed Gyroid structure 104 having wall thickness of 10 μm. This material has an especially high permeability to $CO_2$, $O_2$, and other gases, making it attractive for $CO_2$ absorbers, bioreactors and other applications. Similar stereolithography techniques in development and present day Direct Ink Write systems can be used to print TPMS transport mechanisms (e.g., reactors and/or heat exchangers) in porous ceramics and other porous materials. The pores can subsequently be backfilled with cells, enzymes, or inorganic catalysts to create reactors for a wide variety of applications. By flowing a polymer precursor through one of the volume domains, such a porous TPMS backbone can subsequently be sealed on one or both sides to hold in the active component, or to keep the pores empty for gas transport.

Overall, the TPMS geometries combined with the new geometric and fabrication concepts presented here offer a flexible platform, attractive for a wide range of industrial applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A transport mechanism apparatus for transporting at least one of a gas or a liquid, the apparatus comprising:
    an inlet;
    an outlet;
    a triply periodic minimal surface (TPMS) structure formed in a three dimensional (3D) printing operation to include cells propagating in three dimensions, where the cells include wall portions having openings, and where the cells form a plurality of flow paths throughout the transport mechanism apparatus from the inlet to the outlet, and where the cells form the inlet and the outlet, and where the cells have an engineered construction feature which creates a non-uniform construction for the cells over a length of the TPMS structure between the inlet and the outlet; and
    wherein the cells form a hierarchical structure.

2. The apparatus of claim 1, wherein the engineered construction feature causes the cells to decrease smoothly in size from the inlet moving towards the outlet.

3. The apparatus of claim 1, wherein the engineered construction feature causes the cells to decrease smoothly in size moving from the outlet to the inlet.

4. The apparatus of claim 1, wherein the engineered construction feature causes the cells to decrease smoothly in size moving from the inlet and outlet towards a central portion of the apparatus.

5. The apparatus of claim 1, wherein the engineered construction feature causes a thickness of the wall portions of the cells to be non-uniform across at least one of a length (X plane), a height (Y plane) and a depth (Z plane) of the apparatus.

6. The apparatus of claim 1, wherein the wall portions comprise at least one of:
    a gas separation membrane; or
    a gas absorption monolith.

7. The apparatus of claim 1, wherein the TPMS structure is defined by a level set function which helps to produce the engineered construction feature.

8. The apparatus of claim 7, wherein the level set function comprises:
    F(x, y, z)=t, where:
    t=constant which determines a volume of fractions of two domains separated by a level set surface; and
    F(x, y, z) controls a shape of a geometry of the cells of the TPMS structure.

9. The apparatus of claim 1, wherein the TPMS structure is defined using level set surfaces that divide the TPMS structure into three continuous volumes, to produce the engineered construction feature.

10. The apparatus of claim 1, wherein the TPMS structure comprises at least one of:
    a Gyroid surface structure;
    a Schwarz-D surface structure;
    a Schwarz-P surface structure; and
    a I-WP bi-continuous surface structure.

11. The apparatus of claim 1, wherein the engineered construction feature creates the cells to be non-uniform in size over at least one of a length (X plane), a height (Y plane) and a depth (Z plane) of the apparatus.

12. The apparatus of claim 11, wherein a size gradient of the cells is controlled in accordance with the formula:

$$L_{modified} = L + (1 - H_\varepsilon(\varphi))Lf$$

where L is a length of the cell, and f a shrinkage or expansion factor of the cell;

where $H_\varepsilon(\varphi)$ is a smoothed Heaviside function which determines the nature of variation of a graded zone:

$$H_\varepsilon(\phi) = \begin{cases} 1, & \phi < -\varepsilon \\ \left[1 + \frac{\phi}{\varepsilon} + \frac{1}{\pi}\sin\left(\frac{\pi\phi}{\varepsilon}\right)\right], & |\phi| \leq \varepsilon \\ x, & \phi > \varepsilon \end{cases}$$

and where φ(x, y, z) is a level set function to determine where a modification in the size gradient takes place along the apparatus.

13. The apparatus of claim 1, wherein the TPMS structure is formed using at least one of:
    fused deposition modeling; and
    direct metal laser sintering.

14. The apparatus of claim 1, wherein the cells are formed such that the walls comprise at least one of:
    a permeable printed support;
    a printed composite sorbent; or
    an impermeable conductive support; or
    a permeable membrane that forms at least one of a gas contacting surface or a liquid contacting surface.

15. A transport mechanism apparatus for transporting at least one of a gas or a liquid, the apparatus comprising:
    an inlet;
    an outlet;
    a triply periodic minimal surface (TPMS) structure formed in a layer-by-layer three dimensional (3D) printing operation to include cells propagating in three dimensions, where the cells include wall portions having openings, and where the cells form a plurality of flow paths throughout the transport mechanism apparatus from the inlet to the outlet, and where the cells form the inlet and the outlet, and where the cells have an engineered construction feature which creates a non-uniform construction for the cells over a length of the TPMS structure between the inlet and the outlet; and
    at where the engineered construction feature creates the cells with at least one of a wall thickness or a dimension which is non-uniform to form a hierarchical structure, in a predetermined manner, across at least one of a length (X plane), a height (Y plane) or depth (Z plane) of the apparatus.

16. The apparatus of claim 15, wherein the wall thickness is non-uniform such that the wall thickness decreases along a length of the apparatus from the inlet to the outlet.

17. The apparatus of claim 15, wherein the wall thickness of the cells is non-uniform such that the dimension of the cells decreases over a portion of a length of the apparatus.

18. The apparatus of claim 15, wherein the TPMS structure comprises at least one of:
- a Gyroid surface structure;
- a Schwarz-D surface structure;
- a Schwarz-P surface structure; and
- a I-WP bi-continuous surface structure.

19. A method for forming a transport mechanism for transporting at least one of a gas or a liquid, comprising:
- using a three dimensional (3D) printing operation to form the transport mechanism with an inlet and an outlet;
- controlling the 3D printing operation in inlet to create the transport mechanism as a triply periodic minimal surface (TPMS) structure formed in a layer-by-layer process using the 3D printing operation; and
- further controlling the 3D printing operation such that the TPMS structure includes cells propagating in three dimensions, where the cells include wall portions having openings, and where the cells form a plurality of flow paths throughout the transport mechanism from the inlet to the outlet, and where the cells where the cells have an engineered construction feature which creates a non-uniform construction for the cells over a length of the TPMS structure between the inlet and the outlet, and where the engineered construction feature causes the cells to be formed with at least one of:
  - a varying dimension throughout the transport mechanism; or
  - a varying wall thickness throughout the transport mechanism; to form a hierarchical structure.

20. The apparatus of claim 1, wherein the cells are formed such that the walls comprise a permeable membrane that forms at least one of a gas contacting surface or a liquid contacting surface with a heat exchange operation.

21. A transport mechanism apparatus for transporting at least one of a gas or a liquid, comprising:
- an inlet;
- an outlet;
- a central portion between the inlet and the outlet;
- a triply periodic minimal surface (TPMS) structure formed in a three dimensional (3D) printing operation to include cells propagating in three dimensions, where the cells include wall portions having openings, and where the cells form a plurality of flow paths throughout the transport mechanism apparatus from the inlet to the outlet, and where the cells form the inlet and the outlet; and
- wherein the cells decrease smoothly in size moving from the inlet and outlet towards the central portion of the transport mechanism apparatus.

* * * * *